United States Patent
Miyazaki et al.

(10) Patent No.: US 6,926,053 B2
(45) Date of Patent: Aug. 9, 2005

(54) PNEUMATIC TIRE VARIABLE ELASTICITY MODULES METALLIC BAND CORD

(75) Inventors: Shinichi Miyazaki, Kobe (JP); Kazumi Yamazaki, Kobe (JP); Osamu Toda, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 172 days.

(21) Appl. No.: 10/183,514

(22) Filed: Jun. 28, 2002

(65) Prior Publication Data

US 2003/0010418 A1 Jan. 16, 2003

(30) Foreign Application Priority Data

Jun. 29, 2001 (JP) ............................. 2001-199306

(51) Int. Cl.⁷ ...................... B60C 9/22; B60C 9/20; B60C 9/00; D07B 1/06
(52) U.S. Cl. ................ 152/527; 152/531; 152/533
(58) Field of Search .................. 152/527, 531, 152/533

(56) References Cited

U.S. PATENT DOCUMENTS

| | | | |
|---|---|---|---|
| 4,945,967 A | * 8/1990 | Tavazza et al. | 152/531 |
| 5,562,792 A | * 10/1996 | Caretta | 152/533 X |
| 5,738,740 A | * 4/1998 | Cluzel | 152/527 |
| 5,988,246 A | * 11/1999 | Villani et al. | 152/531 X |
| 6,062,284 A | 5/2000 | Caretta | |
| 6,082,425 A | * 7/2000 | Colom | 152/531 X |
| 6,082,426 A | * 7/2000 | Colom | 152/527 |
| 6,367,527 B1 | * 4/2002 | Cluzel | 152/527 |
| 6,371,182 B1 | * 4/2002 | Philpott et al. | 152/531 X |

FOREIGN PATENT DOCUMENTS

| | | |
|---|---|---|
| EP | 1 097 824 A2 | 5/2001 |
| EP | 1 127 718 A2 | 8/2001 |
| EP | 1 284 318 A1 * | 2/2003 |
| JP | 2001-032184 A | 2/2001 |
| WO | WO 97/30856 A1 | 8/1997 |
| WO | WO-01/90478 A1 * | 11/2001 |

OTHER PUBLICATIONS

Derwent patent family data for EP 1 127 718 A2.*

* cited by examiner

*Primary Examiner*—Adrienne C. Johnstone
(74) *Attorney, Agent, or Firm*—Birch, Stewart, Kolasch & Birch, LLP

(57) ABSTRACT

A pneumatic tire comprises a carcass extending between the bead portions and a band disposed radially outside the carcass in a tread portion and made of at least one cord laid at an angle of not more than 5 degrees with respect to the tire equator, and the band cord is made of steel filaments twisted together so as to have a variable elasticity modulus which has a transitional point from under 1000 kgf/sq.mm to over 1000 kgf/sq.mm at an elongation percentage in a range of from 1% to 5%. Preferably, the average elasticity modulus $EL_n$ of the cord from zero elongation to the transitional point is in a range of from 500 to 750 kgf/sq.mm, and the average elasticity modulus $EH_n$ of the cord from the transitional point to a breaking point of the cord is in a range of from 1200 to 3000 kgf/sq.mm.

6 Claims, 3 Drawing Sheets

PNEUMATIC TIRE VARIABLE ELASTICITY MODULES METALLIC BAND CORD

FIELD OF THE INVENTION

The present invention relates to a pneumatic tire, more particularly to a tread reinforcing belt structure being capable of improving high-speed durability and noise performance.

DESCRIPTION OF RELATED ART

In general, radial tires for high-speed use are provided in the tread portion with a breaker and a band functioning as a hoop to improve high-speed durability. In order to reinforce such a tread band, hitherto, organic fiber cords especially nylon cords are widely used because nylon cords can elongate during vulcanizing the tire and heat set after vulcanization to display a high elasticity modulus which is necessary for the tread band.

In recent years, on the other hand, there is a great demand for a pneumatic tire which is quiet and which has excellent durability under high speed running. Such demand is especially remarkable in passenger car tires.

SUMMARY OF THE INVENTION

It is therefore, an object of the present invention to provide a pneumatic tire, in which the high-speed durability and noise performance are improved.

According to the present invention, a pneumatic tire comprises a tread portion, a pair of sidewall portions, a pair of bead portions, a carcass extending between the bead portions through the tread portion and sidewall portions, and a band disposed radially outside the carcass in the tread portion and made of at least one cord laid at an angle of not more than 5 degrees with respect to the tire equator, wherein the band cord is made of metallic filaments twisted together so as to have a variable elasticity modulus which has a transitional point from under 1000 kgf/sq.mm to over 1000 kgf/sq.mm at an elongation percentage in a range of from 1% to 5%.

BRIEF DESCRIPTION OF THE DRAWINGS

Embodiments of the present invention will now be described in detail in conjunction with the accompanying drawings.

DETAILED DESCRIPTION OF THE INVENTION

Figure 1:
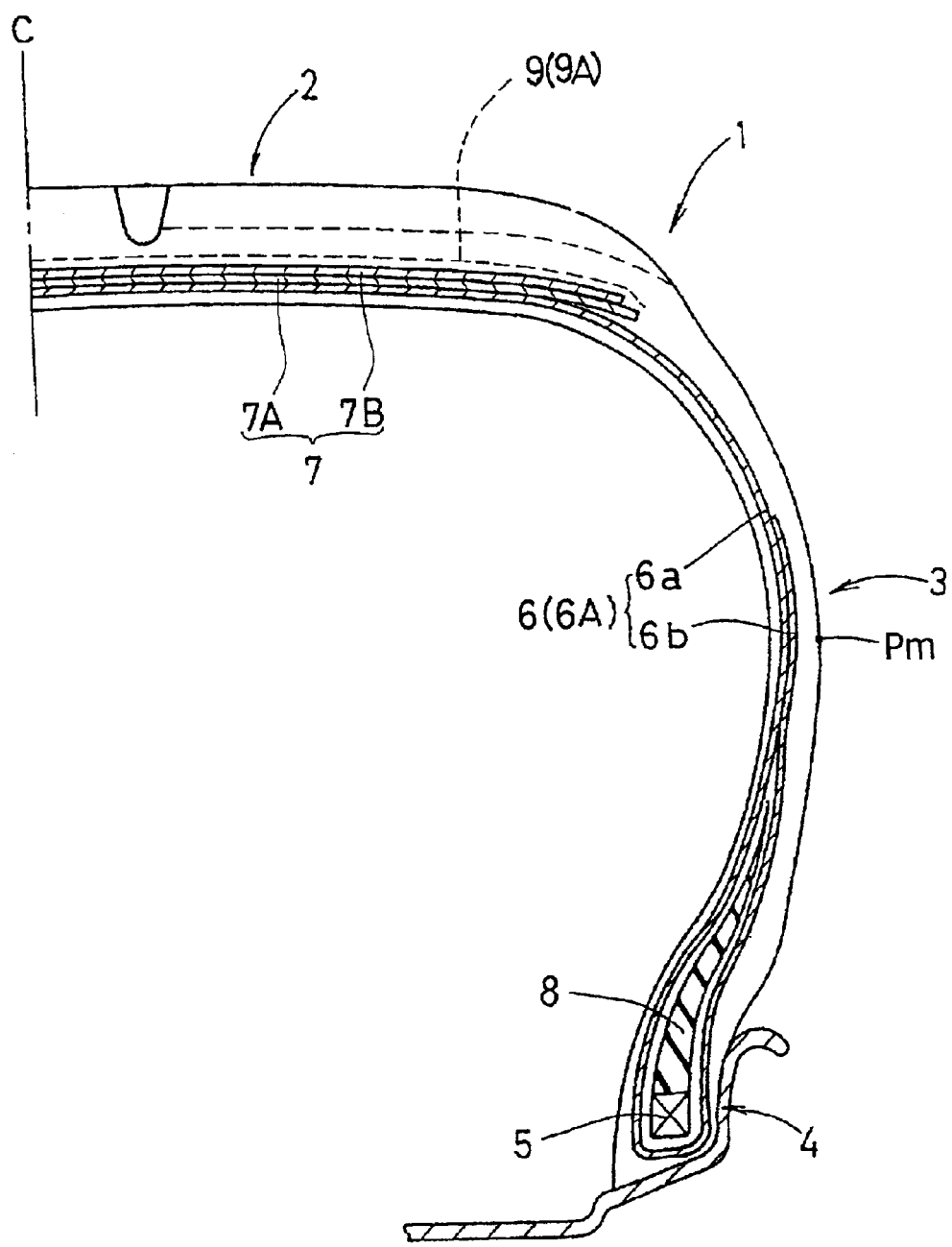
FIG. 1 is a cross sectional view of a pneumatic tire according to the present invention.

In FIG. 1, pneumatic tire 1 according to the present invention comprises a tread portion 2, a pair of axially spaced bead portions 4 each with a bead core 5 therein, a pair of sidewall portions 3, a carcass 6 extending between the bead portions 4 through the tread portion 2 and sidewall portions 3, a breaker 7 disposed radially outside the carcass 6 in the tread portion 2, and a band 9 disposed radially outside the breaker 7. In this example, the pneumatic tire 1 is a radial tire for passenger cars.

The carcass 6 is composed of at least one ply 6A of carcass cords arranged at an angle of from 70 to 90 degrees with respect to the tire circumferential direction, extending between the bead portions 4 through the tread portion 2 and sidewall portions 3, and turned up around the bead core 5 in each bead portion 4 from the inside to the outside of the tire so as to form a pair of turned up portions 6b and one main portion 6a therebetween. Incidentally, between the main portion 6a and each turned up portion 6b, there is disposed a bead apex rubber 8 extending radially outwards from the bead core 5 while tapering towards its radially. As to the material of the carcass cords, organic fiber cords, e.g. nylon, polyester, rayon, aromatic polyamide and the like are suitably used in case of passenger car tire. But, steel cords are also used according to the tire size, category, use and the like.

In this example, the carcass 6 is composed of one ply 6A of polyethylene terephthalate fiber cords arranged radially at 90 degrees with respect to the tire equator. And the turned up portions 6b extends radially outwardly beyond the radially outer end of the bead apex rubber 8 so as to adjoin the main portion 6a, and further, it extends over the maximum tire section width point Pm and terminates in the sidewall portion 3.

The breaker 7 is composed of at least two cross plies 7A and 7B of high modulus cords laid at an angle of from 10 to 35 degrees with respect to the tire circumferential direction. For the breaker cords, steel cords or high modulus organic fiber cords, e.g. aromatic polyamide fiber, aromatic polyester fiber and the like are suitably used. In this example, the breaker 7 is composed of two cross plies 7A and 7B of steel cords laid at 20 degrees with respect to the tire equator.

The band 9 is composed of at least one ply 9A of at least one band cord 10 whose cord angle formed with the tire circumferential direction is not more than 5 degrees. In this example, the band 9 is composed of only one ply 9A disposed on the radially outer surface of the breaker 7 and extending across the entire width of the breaker 7.

Figure 2:
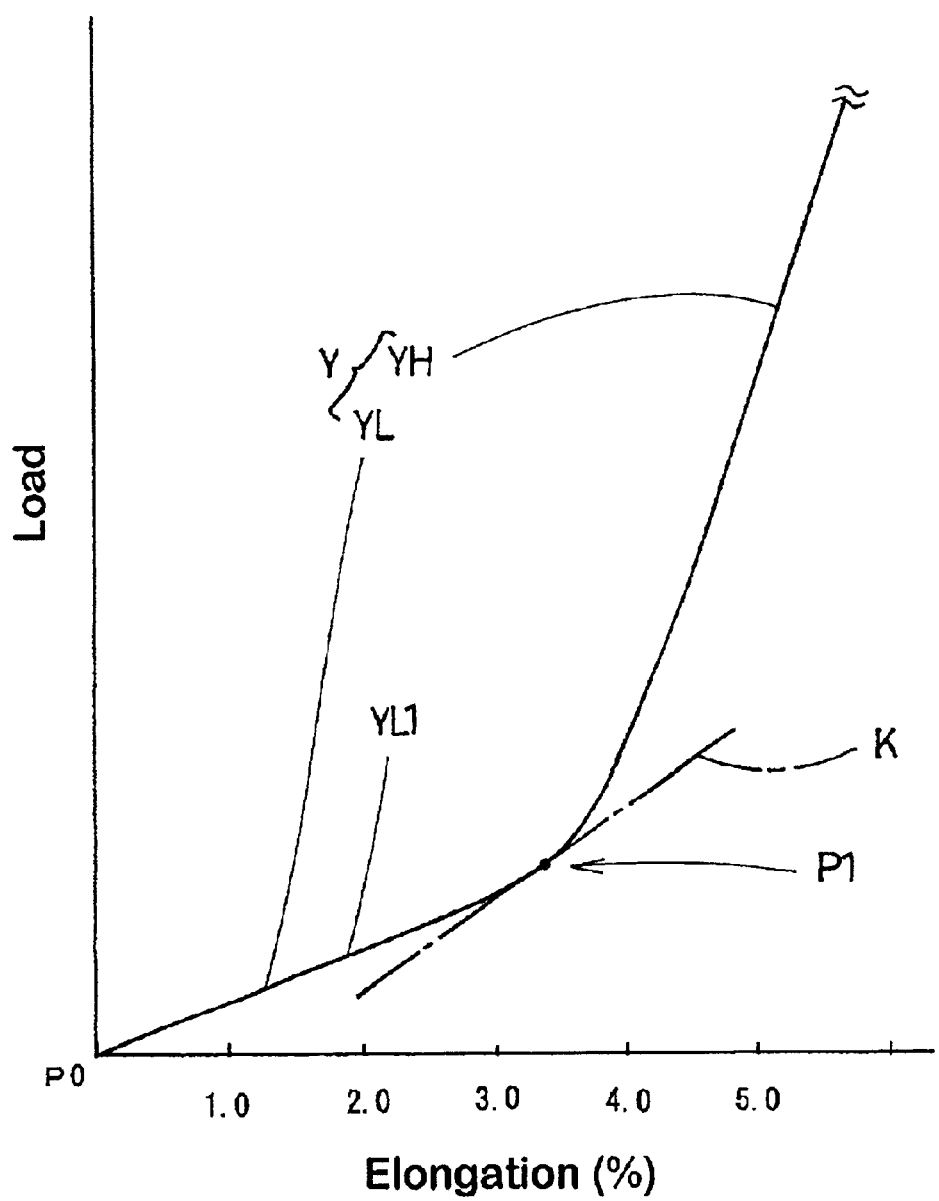
FIG. 2 shows a load-elongation curve of a band cord.

The band cord 10 has a load-elongation characteristic such that, as shown in FIG. 2, the load-elongation curve Y has a low modulus part YL between the origin P0 and a point P1 in which part the elasticity modulus EL is less than 1000 kgf/sq.mm and a high modulus part YH between the point P1 and a breaking point (not shown) in which part the elasticity modulus EH is more than 1000 kgf/sq.mm. Thus, the point P1 is the transitional point from the low modulus part YL to the low modulus part YL OR from under 1000 kgf/sq.mm to over 1000 kgf/sq.mm. Because the elasticity modulus E corresponds to the inclination of the tangent K to the load-elongation curve Y, the inclination at the transitional point P1, corresponds to the modulus of 1000 kgf/sq.mm. In other words, the point P1 can be defined as such.

As to the position of the transitional point P1, it is set in the elongation range of from 1.0 to 5.0%. In this example, as shown in FIG. 2, the low modulus part YL is almost straight. Specifically, the modulus is substantially constant through at least 60% of the overall length of the low modulus part YL. The low modulus part YL includes such a substantially straight continuous part YL1.

It is preferable that the average elasticity modulus ELn in the low modulus part YL is set in a range of from 500 to 750 kgf/sq.mm, and the average elasticity modulus EHn in the high modulus part YH is set in a range of from 1200 to 3000 kgf/sq.mm.

Here, the average elasticity modulus ELn is defined as an elasticity modulus corresponding to the inclination of a straight line drawn between the origin P0 and the transitional point P1. The average elasticity modulus EHn is defined as an elasticity modulus corresponding to the inclination of a straight line drawn between the transitional point P1 and the breaking point. In other words, the average elasticity modulus ELn is the ratio of the stress difference to strain difference, each between the origin P0 and the transitional point P1. The average elasticity modulus EHn is the ratio of the stress difference to strain difference, each between the transitional point P1 and the breaking point.

When vulcanizing the raw tire in a mold, a certain degree of stretch is necessary for the raw band to prevent deformation of the tire and lowering of tire uniformity. As the modulus of the band cord 10 is relatively low at the initial stage of elongation, the necessary stretch of the raw band can be secured. on the other hand, in the finished tire, as the stretch is locked, the load-elongation characteristic of the band cord 10 shifts towards the high modulus part YH, and because of the very high modulus, the hoop effect of the band can be greatly increased in comparison with the conventional organic fiber cord band and thereby the high-speed durability can be improved. Further, as the rigidity of the tread portion is increased in comparison with the organic fiber cord band, the vibration transfer function favorably alters, and as a result, the noise performance can be improved.

If the moduli are outside the ranges, it is difficult to secure the sufficient stretch and thus it becomes difficult to improve the high-speed durability and the like. If the average elasticity modulus EHn is more than 3000 kgf/sq.mm, the ride comfort is deteriorated.

Figure 3:
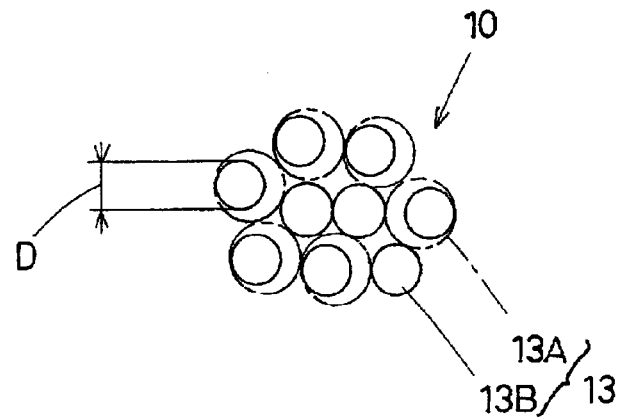
FIG. 3 is a cross sectional view of a band cord.

The band cord 10 is made of steel filaments 13 twisted together as shown in FIG. 3. Preferably, the number of the steel filaments 13 is in a range of from 2 to 14, and the diameter D of the steel filament is in a range of from 0.10 to 0.25 mm.

Figure 4:
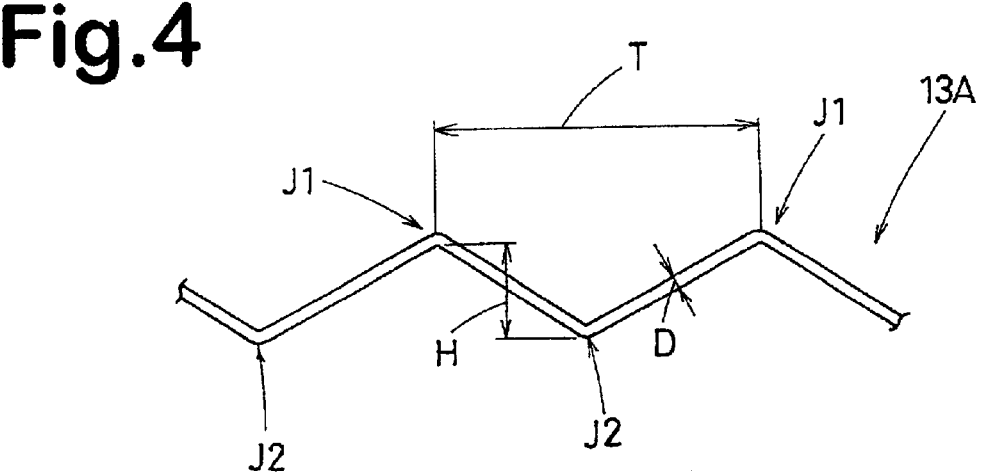
FIG. 4 show a waved filament.

In order to achieve the above-mentioned load-elongation characteristic, the steel filaments 13 include a waved filament 13A and optional nonwaved filament 13B. The waved filament 13A is, in a state before being twisted together, shaped into a two-dimensional zigzag waveform as shown in FIG. 4. The nonwaved filament 13B is substantially straight in a state before being twisted together. As the two-dimensional zigzag waveform, a triangular waveform or sine waveform having a wave length T of 0.5 to 10.0 mm and a wave height H of 0.1 to 1.0 mm may be suitably used. In comparison with three-dimensional waving, such two-dimensional waving is easy to make, precise and stable, and thus, preferable. The number of the waved filaments 13A is preferably at least 30% of the total number of the metallic filaments 13.

Therefore, due to the waved filaments 13, the band cord 10 displays a lower modulus while the elongation percentage of the cord is small and until the waved filaments approach straight. After the waved filaments approach straight and the elongation percentage reaches to that of P1, the band cord 10 displays a higher modulus.

As to the twist structure of the band cord, in this example, all the metallic filaments 13 are, as a single bunch, twisted together into a band cord 10, while twisting each filament around its longitudinal axis. Accordingly, the two-dimensional waveform becomes the three-dimensional waveform in the finished cord, and gaps through which the topping rubber can penetrate into the cord are stably formed between the metallic filaments 13. Therefore, not only the above-explained necessary load-elongation characteristic is provided but also the rubber penetration is improved. Further, fretting of the filaments can be effectively controlled to improve the fatigue resistance of the cord.

Aside from the above-mentioned twist structure, the band cord 10 may be formed as follows. First, bunches of two to five filaments are made and then the bunches are twisted together into a cord, while twisting each bunch around its longitudinal axis.

Figure 5:
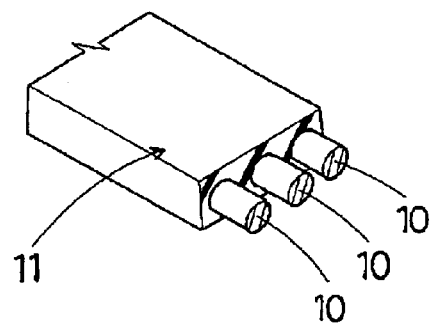
FIG. 5 is a perspective view of a tape.

The above-mentioned band ply 9A can be formed by applying a wide strip of rubberized parallel cords 10 to the radially outside of the carcass and splicing the circumferential ends thereof. In this example, however, in order to avoid splicing problems, the band ply 9A is formed by spirally winding a rubber tape 11 in which several cords 10 are embedded in parallel with each other along the length thereof as shown in FIG. 5. In this example, as explained above, the band is wound as a single layer of band cords. But, it is also possible to wind two or more layers over the entire width of the breaker. Further, it is also possible to wind partially double in a particular portion especially in the breaker edge portion and a single layer in other portion.

Comparison Tests

Test tires of size 195/65R15 for passenger cars, having the structure shown in FIG. 1 and specifications shown in Table 1 were made and tested for high-speed durability and noise performance. In each test tire, the carcass was composed of a single ply of 1670 dtex/2 polyethylene terephthalate fiber cords arranged radially at 90 degrees with respect to the tire equator. The breaker was composed of a ply of 1×1×0.42 steel cords laid parallel with each other at +20 degrees and a ply of 1×1×0.42 steel cords laid parallel with each other at −20 degrees with respect to the tire equator.

High-speed durability test: using a tire test drum, an accelerated high-speed durability test was conducted. The running speed was increased every ten minutes at steps of 10 km/h from an initial speed of 170 km/h, and the running distance until any failure or damage occurred, was measured. The ambient temperature was 25+/−5 deg.C. The tire load was 150% of the maximum load specified in the Japanese Industrial Standard. The tire pressure was 80% of the standard pressure specified in the Japanese Industrial Standard. The results are indicated in Table 1 by an index based on Ref.1 being 100, wherein the larger the index number, the better the high-speed durability.

Road noise test: A test car provided on all the four wheels with test tires was coasted on a smooth road surface at a speed of 80 km/hr, and the overall noise level in dB(A) was measured near the driver's inside ear.

The results are indicate in Table 1 by an index based on Ref.1 being 100, wherein the larger the index number, the better the road noise.

TABLE 1

| Tire | Ref. 1 | Ref. 2 | Ex. 1 | Ex. 2 |
|---|---|---|---|---|
| Band cord | | | | |
| Structure | 1 × 9 × 0.17 | 1 × 9 × 0.17 | 1 × 9 × 0.17 | 1 × 9 × 0.17 |
| Low modulus part | presence | absence | presence | presence |
| Modulus ELn (Kgf/sq.cm) | 500/850 | — | 500 | 750 |
| High modulus part | absence | presence | presence | presence |
| Modulus EHn (Kgf/sq.cm) | — | 2300 | 1750 | 2300 |
| Position *1 of point P1 | — | — | 2.0 | 3.5 |

TABLE 1-continued

| Tire | Ref. 1 | Ref. 2 | Ex. 1 | Ex. 2 |
|---|---|---|---|---|
| Number of waved filaments | 9 | 0 | 6 | 9 |
| Wave length T (mm) | 5 | 5 | 5 | 5 |
| Waved height H (mm) | 0.5 | 0.5 | 0.5 | 0.5 |
| High-speed durability | 100 | 101 | 108 | 115 |
| Road noise | 100 | 95 | 105 | 106 |

*1 Elongation percentage is shown.
Ref. 1: The load-elongation curve was made up of a substantially straight part where the modulus was almost 500 Kgf/sq.cm and a substantially straight part where the modulus was almost 850 Kgf/sq.cm.
Ref. 2: The entirety of the load-elongation curve was substantially straight.

What is claimed is:

1. A pneumatic tire comprising
    a tread portion,
    a pair of sidewall portions,
    a pair of bead portions,
    a carcass extending between the bead portions through the tread portion and sidewall portions, and
    a band disposed radially outside the carcass in the tread portion and made of at least one cord laid at an angle of not more than 5 degrees with respect to the tire equator, wherein
        the band cord is made of metallic filaments twisted together so as to have a variable elasticity modulus which has a transitional point from under 1000 kgf/sq.mm to over 1000 kgf/sq.mm at an elongation percentage in a range of from 1% to 5%,
        an average elasticity modulus $EL_n$ of the cord from zero elongation to the transitional point is in a range of from 500 to 750 kgf/sq.mm, and
        an average elasticity modulus $EH_n$ of the cord from the transitional point to a breaking point of the cord is in a range of from 1200 to 3000 kgf/sq.mm.

2. A pneumatic tire according to claim 1, wherein
    the total number of the metallic filaments is in a range of from 2 to 14, and
    the diameter D of the metallic filaments is in a range of from 0.10 to 0.25 mm.

3. A pneumatic tire according to claim 1, wherein
    the metallic filaments include at least one waved filament whose number is at least 30% of the total number of the metallic filaments, and
    the waved filament is shaped into a two-dimensional waveform before being twisted together.

4. A pneumatic tire according to claim 3, wherein the two-dimensional waveform of the waved filament has a wave length of 0.5 to 10.0 mm and a wave height of 0.1 to 1.0 mm.

5. A pneumatic tire according to claim 4, wherein the two-dimensional waveform of the waved filament is a zigzag, triangular or sine waveform.

6. A pneumatic tire according to claim 3, wherein the two-dimensional waveform of the waved filament is a triangular or sine waveform.

* * * * *